000
UNITED STATES PATENT OFFICE.

MARK R. LAMB, OF SANTIAGO, CHILE, ASSIGNOR TO ALLIS-CHALMERS MANUFACTURING COMPANY, OF MILWAUKEE, WISCONSIN, A CORPORATION OF DELAWARE.

PROCESS OF FILTERING.

1,242,355. Specification of Letters Patent. Patented Oct. 9, 1917.

No Drawing. Application filed June 22, 1914. Serial No. 847,133.

*To all whom it may concern:*

Be it known that I, MARK R. LAMB, a citizen of the United States, residing at Santiago, Chile, have invented a certain new and useful Improvement in Processes of Filtering, of which the following is a specification.

This invention relates to filtering by the use of a filter leaf and especially to the filtering of a solution of nitrate salt from slimes of the raw material in which it is found; and more generally it is concerned with the filtering of a solution of salts from slimes of the raw material where other salts are also present in the raw material.

The object of the invention is to prevent the falling off of the cake of residue from the filter leaf during the process of washing the cake.

It has been found that when the nitrate deposits contain a great deal of foreign salt such as, for instance, sodium chlorid, the cake formed on the filter consists sometimes of ten to fifty per cent. of sodium chlorid. If water is used as a wash, the strength of the cake, or its resistance to deformation, is so reduced that it falls from the leaf. This is because the fresh water removes a great deal of the sodium chlorid present in the cake making same "rotten." Even if the cake formed on the filter does not become so "rotten" as to cause the same to fall from the leaf, it may become so "piped" as to draw all of the wash medium through the "pipes" and thus fail to remove the niter remaining in the cake.

In order to overcome this objection it is proposed to wash the cake with a solution of sodium chlorid. It is a well known fact that even a saturated solution of sodium chlorid is capable of taking up sodium nitrate, so that when the wash water consists of such a solution of sodium chlorid the remaining nitrates will be taken up by the solution without taking out any of the sodium chlorid in the cake or in other words, without "rotting" same, so that it will remain attached to the filter leaf during the process of washing. Usual processes are then employed for separating the sodium nitrate from the sodium chlorid.

It is intended that the scope of this invention is such as to include its application to the washing of a cake formed in the filtering from slimes of raw material of a solution of any salt when said raw material also has a foreign salt commingled therewith. In any case the wash water will be a solution of the foreign salt. The invention further applies to cases where there is a plurality of foreign salts present in the raw material, and in these cases the wash water will be a solution of all said foreign salts.

It is claimed and desired to secure by Letters Patent,—

1. The process of removing a desirable substance from a filter cake containing said desirable and an undesirable substance, by washing the cake with a solution of the undesirable substance whereby the undesirable substance will remain in said cake and prevent collapse of same.

2. The process of removing niter from a filter cake containing niter and a soluble foreign salt, by washing the cake with a solution of the foreign salt, whereby the foreign salt will remain in said cake and prevent collapse of same.

3. The process of removing niter from a filter cake containing niter and sodium chlorid, by washing the cake with a solution of sodium chlorid whereby the sodium chlorid will remain in said cake and prevent collapse of same.

In testimony whereof, the signature of the inventor is affixed hereto in the presence of two witnesses.

MARK R. LAMB.

Witnesses:
G. F. DE WEIN,
W. H. LIEBER.